J. McCREARY.

Coupling and Steering Apparatus.

No. 5,630

Reissued Oct. 28, 1873.

Witnesses
Jos. L. Coombs
T. M. Coombs

Inventor
John McCreary
By J. L. Coombs
Attorney.

UNITED STATES PATENT OFFICE.

JOHN McCREARY, OF MIDDLETOWN, PENNSYLVANIA.

IMPROVEMENT IN COUPLING AND STEERING APPARATUS.

Specification forming part of Letters Patent No. 129,844, dated July 23, 1872; reissue No. 5,630, dated October 28, 1873; application filed October 11, 1873.

*To all whom it may concern:*

Be it known that I, JOHN McCREARY, of Middletown, in the county of Dauphin and State of Pennsylvania, have invented certain Improvements in Steering Devices for Canal-Boats, of which the following is a specification:

My invention relates to certain improvements in devices for steering canal-boats, &c., described in Letters Patent granted to Elijah and John McCreary, April 16, 1872, No. 125,684, by means of which two boats are coupled together and navigated and steered as one boat by means of a single steering-wheel. The invention described in said Letters Patent consisted, principally, in coupling two boats together by means of a chain or rope passing around a steering-wheel on one boat, and around a system of sheaves or pulleys, and attached to the other boat, for the purpose of steering said boats as well as of coupling them; and in centering said boats together and forming a universal joint between them by means of an overhanging guard or bumper on the stern of the forward boat, with a central notch therein, into which the projecting stem or cut-water of the rear boat fitted. My improvements consist, first, in coupling and centering said boats together and forming a universal joint between them by means of a chain, the two ends of which are fastened to opposite points on the stern of the forward boat, and the central part to the stem or cut-water, or some central point on the bow, of the rear boat, so as to hold its stem or cut-water against the overhanging guard or bumper of said forward boat, said chain serving to center the boats without the necessity of any notch in the overhanging guard for the stem of the rear boat to fit into, and at the same time coupling and holding the boats together and forming a universal joint between them; second, in attaching the ends of the coupling and steering chains to the boats by means of crow-foot claw-hooks, so as to render the chains easily adjustable, as hereinafter shown and described.

Figure 1:
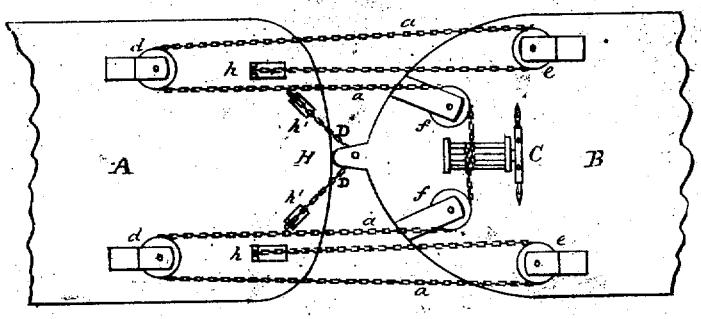
Figure 2:
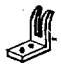

In the accompanying drawing, Figure 1 is a top view of a pair of boats coupled and centered together, showing also the coupling, steering, and centering devices. Fig. 2 is a detached view of one of the claw-hooks, to which the ends of the coupling-chains are attached, on an enlarged scale.

A is the forward boat, and B the rear boat. These boats are coupled together by means of a chain or rope, *a*, the ends of which are fastened to the forward boat by means of the claw-hooks *h h* on said forward boat. The central portion of said chain or rope is wound around a horizontal windlass, C, on the rear boat, and it passes around pulleys or sheaves *d d* on the forward boat, and *e e* and *f f* on the rear boat; but as my improvements relate only to the means of coupling and centering the boats and forming a universal joint between them, and not to the steering mechanism described in said former patent, it is manifest that the number of sheaves or pulleys over which the steering-chain passes can have no effect upon the applicability of my said improvements. D is a chain, the ends of which are attached to the rear overhanging guard H of the forward boat at points *h' h'*, and the central part of which is linked to the stem, or to a central point on the bow, of the rear boat, the said chain being so attached to the forward boat as to have a little slack, but not enough to prevent the overhanging bumper and the stem or cut-water from remaining at all times substantially in contact.

It is essential that there shall be an overhanging guard or bumper on the rear end of the forward boat, to separate the adjacent ends of the hulls, in order to form a universal joint between them, and allow the two boats to assume any angle in respect to each other, whether vertically or laterally, without coming in contact at any point except the point of connection between the stem or cut-water of the one and the overhanging guard or bumper of the other.

E is the steering-wheel, shown in the drawing as placed upon the end of the windlass-shaft; but, in order to gain power, the said wheel may be mounted on a separate shaft, with a small pinion gearing with a larger cog-wheel on the windlass-shaft. By this gearing the power of the windlass may be increased or multiplied to any desired degree.

When a chain is used, the windlass-shaft should be fluted or corrugated to prevent the chain from slipping.

Instead of a horizontal windlass, the chain or rope may be made to pass around a vertical shaft or a chain-wheel, as shown in the said patent of Elijah and John McCreary, of April 16, 1872.

The coupling and steering chains are attached to the forward boat by slipping one of the links edgewise between the claws of the crow-foot. They may thus be easily and quickly adjusted to any degree of tautness or slackness desired.

What I claim as my invention, and desire to secure by Letters Patent, is—

1. The combination of the two boats A and B, the steering-chain *a*, passing around sheaves or pulleys, and around the windlass C, or its equivalent, the overhanging guard or bumper on the stern of the forward boat, and the chain D attached to opposite points on the stern of said boat and to the stem or central part of the bow of the rear boat, so as to form a universal joint between them, and keep them coupled and centered, substantially as shown and described.

2. In combination with the boats A and B and the coupling and steering mechanism herein described, the claw-hooks *h h*, for attaching and adjusting the coupling and steering chains, substantially as set forth.

Witnesses: JOHN McCREARY.

J. J. COOMBS,

T. M. COOMBS.